Figure 4:
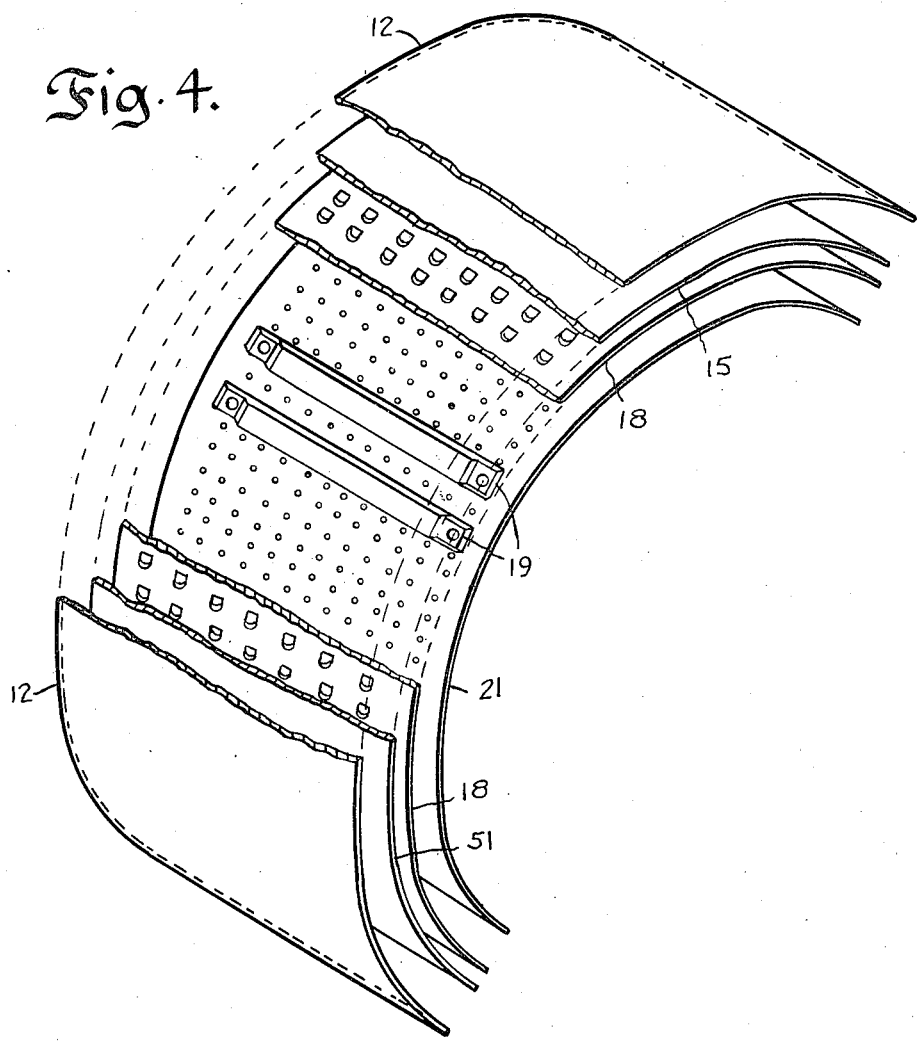

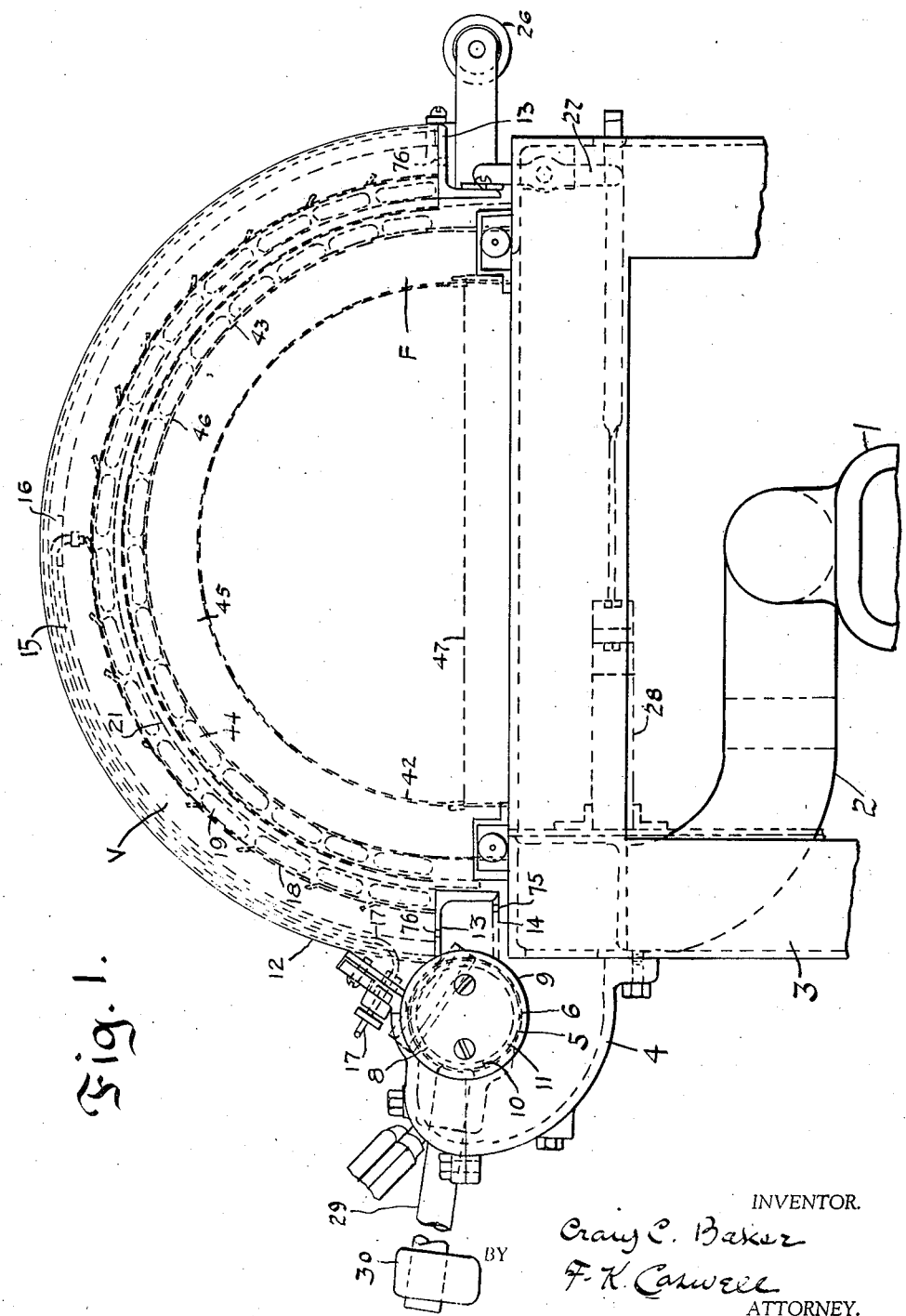

May 11, 1943.  C. C. BAKER  2,319,031
MATRIX DRYING AND FORMING MACHINE
Filed Nov. 20, 1939  7 Sheets-Sheet 2
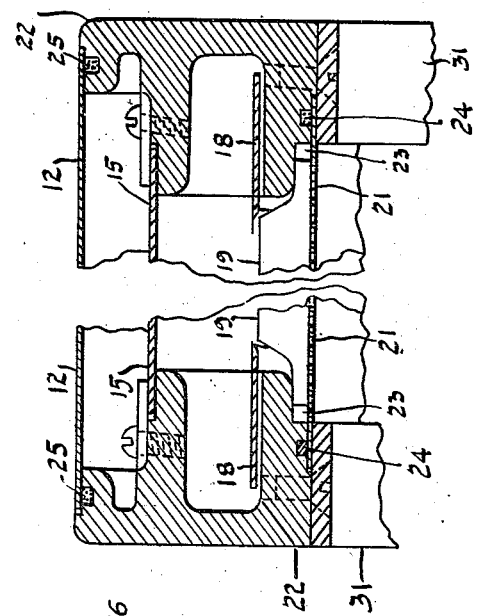
Fig. 3.
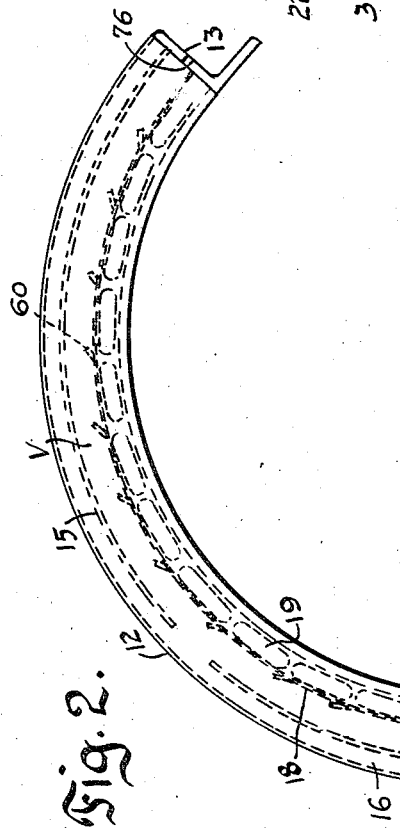
Fig. 2.
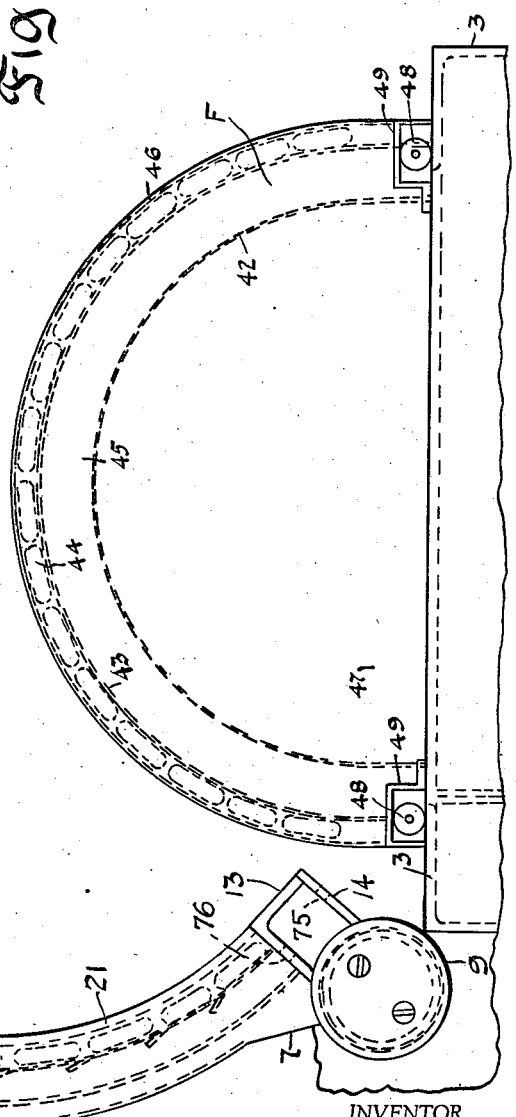
INVENTOR.
Craig C. Baker.
BY F. K. Caswell.
ATTORNEY.

May 11, 1943. C. C. BAKER 2,319,031
MATRIX DRYING AND FORMING MACHINE
Filed Nov. 20, 1939 7 Sheets-Sheet 3

INVENTOR.
Craig C. Baker
BY F. K. Caswell
ATTORNEY.

May 11, 1943.   C. C. BAKER   2,319,031
MATRIX DRYING AND FORMING MACHINE
Filed Nov. 20, 1939   7 Sheets-Sheet 4

INVENTOR.
Craig C. Baker
F. K. Caswell
BY
ATTORNEY.

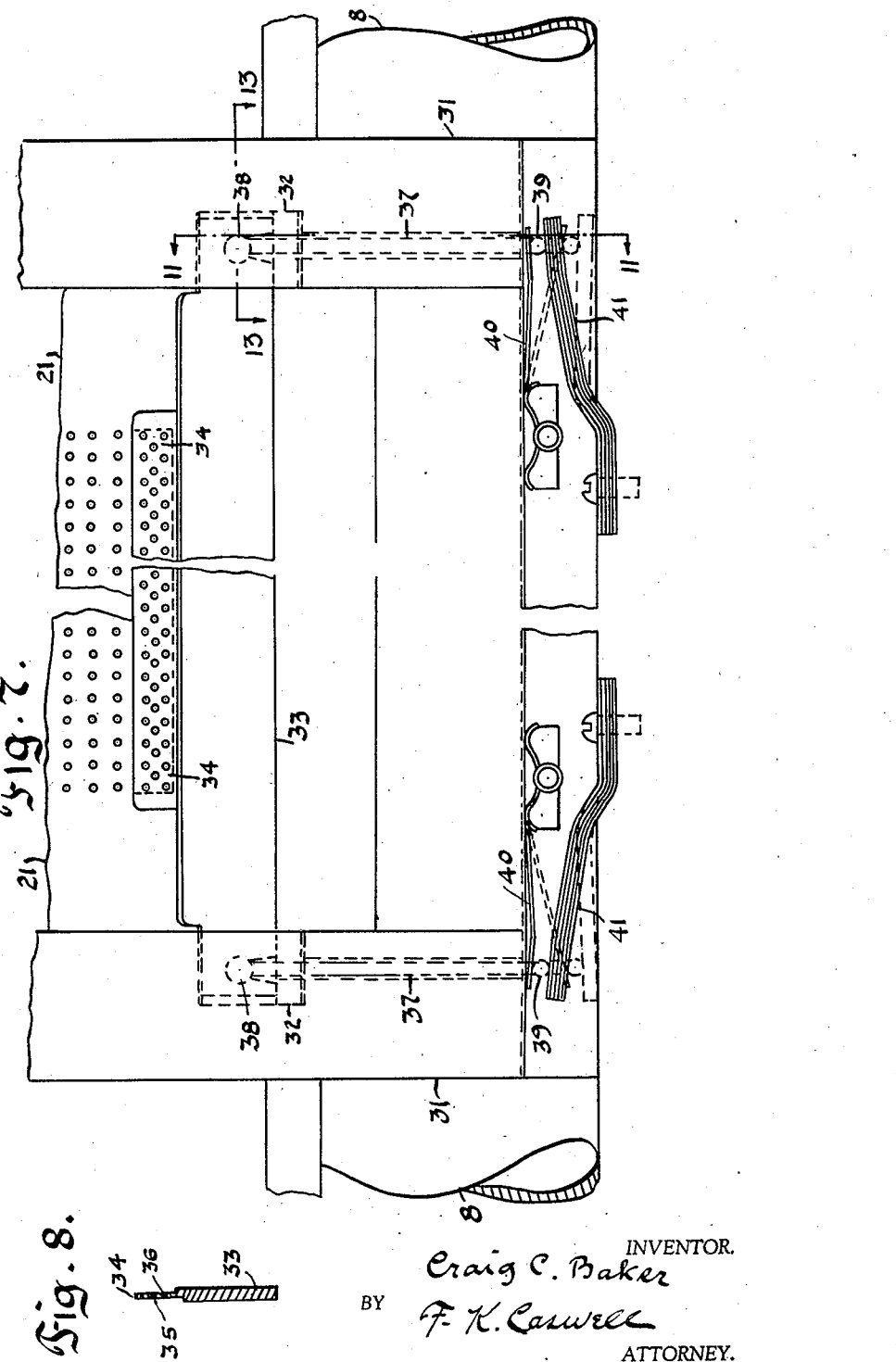

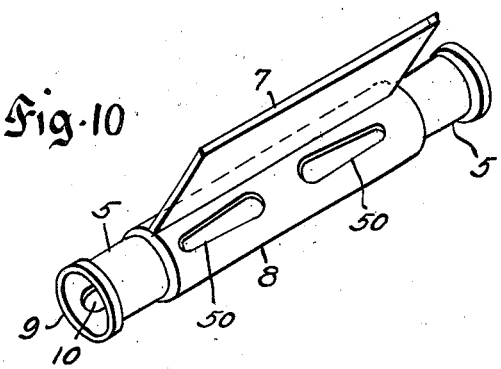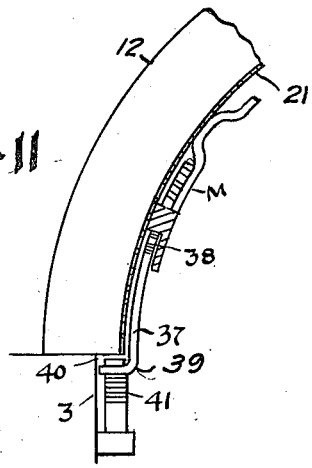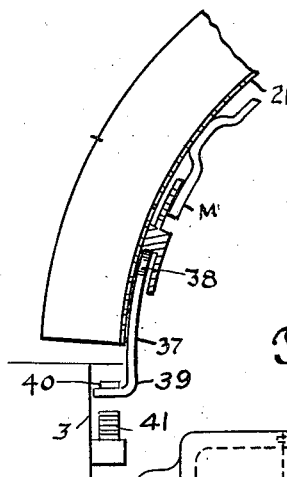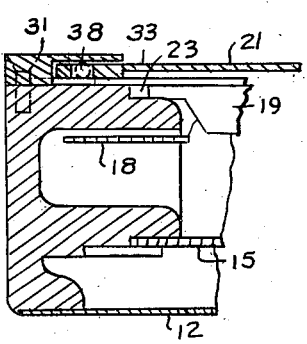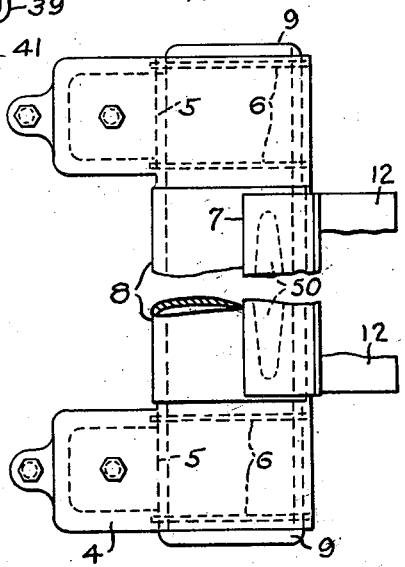

May 11, 1943. C. C. BAKER 2,319,031
MATRIX DRYING AND FORMING MACHINE
Filed Nov. 20, 1939 7 Sheets-Sheet 7

Inventor
Craig. C. Baker
By F. K. Caswell
atty.

Patented May 11, 1943

2,319,031

UNITED STATES PATENT OFFICE 2,319,031

MATRIX DRYING AND FORMING MACHINE

Craig C. Baker, Los Angeles, Calif.

Application November 20, 1939, Serial No. 305,249

4 Claims. (Cl. 34—92)

My invention relates to that class of machines commonly referred to as matrix drying and forming machines, such as are used for the purpose of forming and shaping moist matrices and at the same time removing the moisture therefrom in preparation for their use as casting molds for the production of stereotypes such as are used in printing and particularly for use in connection with newspaper presses. My invention includes a number of improvements over the present types of machines in use. Most of these machines include an oven composed of two heating chambers, one superimposed on the other and adapted to receive and act on the matrix secured between them. This application is a continuation in part of my co-pending application filed on October 21, 1939, Serial Number 300,681, for Matrix drying and forming machines.

Some of the purposes of my invention are as follows: (1) To provide a means for maintaining the form of a raised bolster or margin on each end of the matrix, this being accomplished by mechanically or electrically operated bolster form retaining bars which contact the bolster or edge of each end of the matrix, these bolster bars also being adapted to follow the shrinkage of the matrix, thus preventing warping or distortion of any kind as well as maintaining a more perfect bolster margin: (2) To provide means for directing the heat from the electric heating elements over the surface of the matrix and especially to equalize such heat over the entire area of the matrix for the purpose of insuring uniform and rapid drying, this being aided by an improved type of reflector plate having openings forming miniature louvres: (3) The formation by means of baffle and reflector plates of a vacuum chamber through which is drawn by suction the air and moisture evacuated from the matrix as it dries: (4) To provide a means for evacuating air and moisture from the vacuum chamber utilizing a hollow frame and parts in the hinged bearings and connections between the vacuum chamber and the exhaust manifold, thus eliminating flexible hose connections between the vacuum pump and the vacuum chamber: (5) Draft ports admitting outside air into the vacuum manifold, such ports being so located as to equalize and distribute the vacuum applied over the entire area of the matrix: (6) A perfect fit between the vacuum chamber and the face-heater, this being accomplished by mounting the face-heater on the frame in such a manner as to allow a full floating movement governed by the contour of the vacuum chamber when closed.

Figure 5:
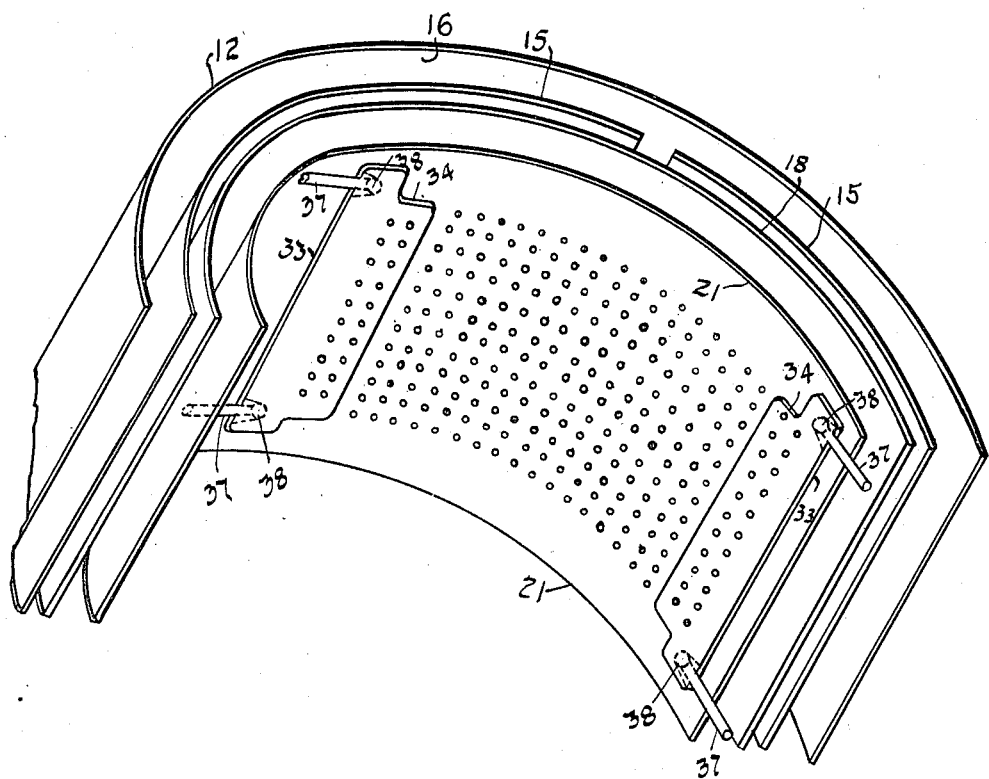
Figure 6:
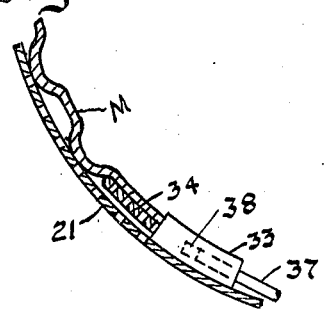
Figure 14:
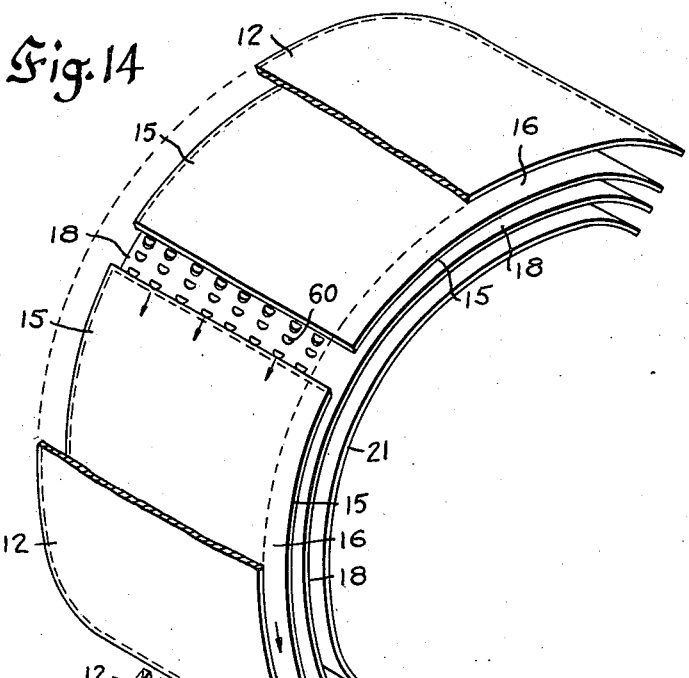
Figure 15:
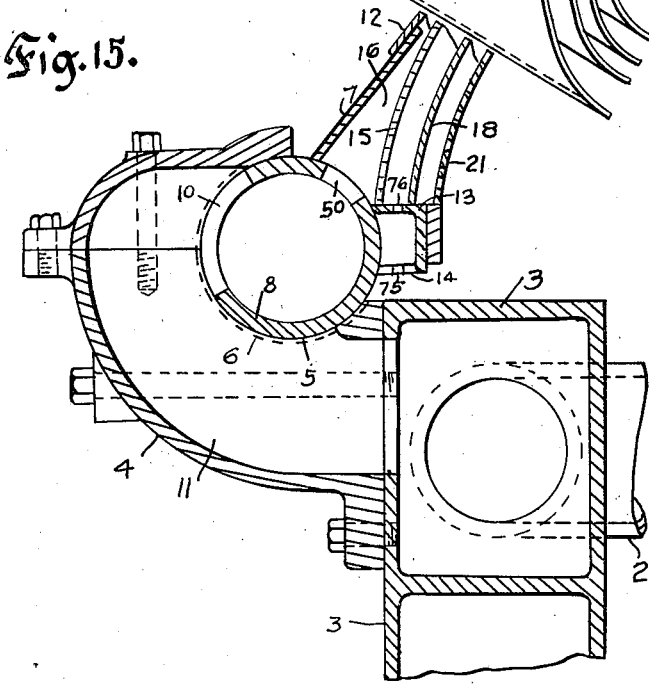

I illustrate my invention by means of the accompanying drawings in which similar numerals in the several views refer to similar parts. Figure 1 is a side elevation of the machine with the vacuum chamber in closed position on the face-heater. Figure 2 is a side elevation of the machine with the vacuum chamber in its open position and showing the face-heater in its normal position. Figure 3 is an enlarged sectional view of the end segmental plates showing the method of attaching the cover plates, baffle plates, reflector and perforated vacuum plates, together with the method of attaching the heating elements. Figure 4 is an isometric diagrammatic view of the plates composing the vacuum chamber together with two of the heating elements shown in position. Figure 5 is an isometric diagrammatic view looking into the vacuum chamber in its open position and showing the bolster bars in position ready to receive the matrix to be formed. Figure 6 is a sectional view through the perforated vacuum plates and showing sectionally the matrix to be formed together with the bolster bar and its actuating rod. Figure 7 is a diagrammatic front view of a part of the vacuum chamber showing the bolster form retaining bars and their spring-actuated operating mechanism. Figure 8 is a sectional view through the bolster bars. Figure 9 is a plan view showing the method of hinging the vacuum plate and its manifold onto the vacuum connections. Figure 10 is an isometric view of the vacuum manifold showing the ports opening from this manifold into the vacuum passage-way. Figure 11 is a side elevation of the bolster bar actuating mechanism taken on the line 11—11 of Figure 7. This view shows the spring mechanism in its closed or "follow-up" position, with the heavy spring in its operative position. Figure 12 is a view similar to Figure 11, but showing the light spring withdrawing the bolster bar somewhat, to permit placing the matrix. Figure 13 is a horizontal section taken on the line 13—13 of Figure 7. Figure 14 is an isometric view similar to Figure 4, but showing the transverse opening between the two portions of the baffle 15. Figure 15 is a vertical central section through the frame, the trunnion brackets and the manifold ends.

The construction of my device is as follows: 1 is a vacuum pump driven by a motor or other convenient means and having connected thereto a suction pipe 2 which in turn is connected to the hollow frame 3. Secured to the upper rear corners of the frame 3 are the trunnion brackets 4 provided with bearings 5 having packing grooves 6. Rotatably mounted in each bearing 5 is one end of a hollow vacuum manifold 8 covered at each end by the cover plates 9 and having ports 50 and 10 connecting the vacuum chamber with the ports 11 of the trunnion brackets 4. Welded to the vacuum manifold 8 is a plate 7 which is in turn welded to the cover plate 12 of the vacuum chamber V. Also welded to the hollow vacuum manifold 8 is a transverse angle 13 and a box closing plate 14, and through the angle member 13 and the closing plate 14 are small ports 76 and 75, respectively, to admit atmospheric air.

The upper or vacuum chamber V consists of a cover plate 12 and a baffle plate 15 which form between them a passageway 16 for the evacuation of steam and moist air for the thermostatic connections 17 terminating in the top of the arch of the cover plate 12. The baffle plate 15 is made in two pieces, leaving a transverse opening between their ends at the top of the arch. The moisture and steam drawn from the matrix by the suction passes through this opening, then down through the passageway 16, through the ports 50, through the manifold 8, the ports 10 and 11, the brackets 4, the hollow frame 3, the suction pipe 2 into and through the vacuum pump 1. Concentric with the cover plate 12 and baffle plate 15 is the reflector plate 18 having perforations in the form of miniature louvres 60, through which pass the air and moisture evacuated from the matrix being formed and dried. Inwardly of the said reflector plate 18 are the electrical heater units 19 and the perforated vacuum plate 21. All of these plates, 12, 15, 18, and 21, are sealed together as one unit by the end plates 22. Provision is made, as at 23, for the expansion of the heater elements 19. The vacuum plate 21 is further sealed by the packing rings 24. The cover plate 12 is sealed by the packing ring 25. The transverse closure of each end of the above group of plates is made by means of the transverse angles 13. The handle 26 provides a means for manually lifting the vacuum chamber V. A latch 27 is also provided and adapted to be operated by a thermostatically controlled solenoid 28. Counterbalance rods and weights 29 and 30 are secured to the manifold 8 and are for the purpose of lifting the vacuum chamber V when released by the latch 27. Inwardly of the perforated vacuum plate 21, extending inwardly along each edge, are the marginal sealing plates 31, and adapted to slide in a recess 32 in the interior of said plates 31 is a bolster forming bar 33 having on its edge adjacent to the end of the matrix a perforated section 34 of reduced thickness. This reduction in thickness on the inner side 35 is for the purpose of allowing the suction to reach the plate, and the reduced thickness 36 on the face of the perforated section 34 is adapted to receive the end of the matrix bolsters in which the form is to be retained. Mounted within the ends of each of the bolster bars 33 are rods 37, each one ending at its upper end in a disc 38 and having its lower end 39 bent at right angles to the main rod 37. Resting above the right-angled end 39 is a weak spring 40 which, when the vacuum chamber is open, tends to draw the bolster bar 33 slightly away from the bolster so as to permit the insertion of the matrix. Underneath the right-angled end 39 of the rod 37 is a much heavier spring 41 secured to the frame which, when the vacuum chamber V is closed, acts on the right-angled rod ends 39 causing the bolster bars 33 to move toward the ends of the matrix and to maintain contact with and follow the matrix ends as they shrink in drying and also to assist in retaining the form of the bolster on the said matrix ends.

To equalize the flow of water-vapor and steam from the matrix so that its evacuation is uniformly distributed from all parts of the surface of the matrix, small ports 76 are drilled through the transverse angle bars 13, to allow atmospheric air to pass into the vacuum chamber.

Mounted on the top of the frame 3 is a face-heater F of a shape to conform to the inner surface of the vacuum chamber V which is approximately semi-cylindrical. The face-heater F consists of a metal sheath 42 and a heater frame 43 on which are mounted heating elements 44. Between the sheath 42 and the frame 43 is a thick layer of insulation 45, preferably of non-inflammable material. Outside the heater elements is stretched a cover 46, preferably consisting of one or more layers of non-inflammable fabric, such as asbestos. On the lower cross-member 47 forming the base of the face-heater F are rollers 48 located at each corner and adapted to be moved and to roll on the top of the frame 3. By means of these rollers 48 the face-heater F can be moved by contact with the vacuum chamber, as it closes into perfect registry. The matrix to be dried and formed is located between the face-heater cover 46 and the inner vacuum plate 21 so that the matrix is subjected to heat from the heating elements 19 of the vacuum chamber V and the heating elements 44 of the face-heater F. This insures equal distribution of heat over the entire surface of the matrix. Means 49 are provided for limiting the movement of the face-heater F both longitudinally and transversely, but with ample possible movement to conform to the vacuum chamber V.

Various other features of my invention may be provided, but these are not shown in the drawings or described in this specification as they are not claimed in this application.

The operation of this machine is as follows: The latch 27 being actuated manually or by means of an electrical control actuating the solenoid 28, the vacuum chamber V is raised to its upright position by means of the counterbalance weight 30. While in this position the matrix is manually placed in position resting within the perforated vacuum plate 21 with its ends adjacent to the bolster bars 33 which have been slightly drawn back by the action of the springs 40, the rods 37, and the connecting discs 38. The matrix is then in position for the drying and forming process to take place. The vacuum chamber V is then closed manually by means of the handle 26 and latched by means of the latch 27. The right-angled ends 39 of the rods 37 are then acted upon by the heavier springs 41, moving the bolster bars up against the ends of the matrix to be formed. The heat is then turned on through the heating elements 19 and 44. The vacuum pump is put in operation, drawing the air and moisture liberated from the matrix by the heat through the baffle plate 18 into the vacuum chamber V, thence into the exhaust manifold 8 through the ports 11 and 10, the brackets 4, the frame 3, and the vacuum pump 1, being liberated at the latter point. It will be noted that the vacuum is applied not only to the vacuum chamber V but also acts through the face-heater cover 46, applying the heat of the face-heating elements 44 to the face of the matrix to be dried.

It will be seen that this machine can be readily equipped so as to make its operation completely automatic except for the manual placing of the matrix in position. For example: electric timing devices can be applied to produce an initial degree of vacuum, changing it to a more powerful vacuum and governing the time and duration of these two operations. In the same manner, the temperature of the heating elements can be automatically regulated and maintained at a constant temperature during the drying and forming of the matrix, or the drying period may be divided into various shorter periods of time, and the temperature may be varied in each of such periods of time. When these timed operations have been completed the solenoid 28 and the latch 27 can then be automatically actuated, thus cutting off all action and opening the vacuum chamber V. The automatic features above outlined are not shown and described in detail in this application as they have not been included in the claims.

What I claim as my invention and desire to secure by Letters Patent is:

1. In a stereotype matrix former and dryer, the combination of a hollow frame, a convex curved face heater so mounted on said frame as to float thereon and provided with a porous resilient covering having mounted thereunder electric heating elements; a matrix-holding vacuum chamber having end sealing plates and an inner perforated vacuum plate curved to conform to said face-heater for receiving a matrix to be dried; a suction manifold on said vacuum chamber hingedly mounted on said frame; electric heating elements mounted within said chamber, a reflector plate having vents therethrough and adjacent to said heating elements; a cover plate for closing the matrix-holding chamber; a baffle plate positioned between said reflector plate and said cover plate to direct and control the flow of air and moisture over the surface of the matrix to assist in the rapid and uniform drying of said matrix; means securing said cover plate, said baffle plate, said reflector plate and said inner perforated vacuum plate to said manifold; means for maintaining the form of a bolster margin on each end of said matrix, said means including a movable bolster bar located at each end of the matrix and provided with means whereby the said bolster bars contact and follow the matrix as it shrinks; means for withdrawing air and moisture from said matrix-holding chamber through said manifold and said hollow frame; means for insuring a continual circulation and instant removal of water vapor and steam from the matrix, said means consisting of ports adapted to admit atmospheric air into the vacuum chamber.

2. In a stereotype matrix former and dryer, the combination of a hollow frame, a convex face-heater so mounted on said frame as to float thereon and provided with a porous resilient covering and having mounted thereunder electric heating elements; a matrix-holding vacuum chamber having end sealing plates and an inner perforated vacuum plate curved to conform to said face-heater for receiving a matrix to be dried, a manifold hingedly connecting said vacuum chamber and said hollow frame, electric heating elements mounted within said chamber adjacent to the inside of said inner vacuum plate; means for producing uniform and rapid drying of the matrix, said means including a reflector plate having vents therethrough and adjacent to said heating element; means for controlling the flow of air and moisture over the surface of the matrix, said means consisting of a baffle plate which, together with the reflector plate and end-sealing plates, form a chamber through which the air and moisture are evacuated, and a cover plate adapted to close the matrix-holding chamber; means securing said cover plate, said baffle plate, said reflector plate and said inner perforated vacuum plate to said manifold; means for maintaining the form of a bolster margin on each end of the said matrix, said means including a movable bolster bar located at each end of the matrix, slideably mounted on said inner vacuum plate and provided with spring-actuated means whereby said bolster bars contact and follow the matrix as it shrinks; means for exhausting air and moisture from said matrix and to hold the matrix in contact with said vacuum plate, said means including a passage-way through the hollow frame, the manifold, and the matrix-holding chamber; means for insuring a continual circulation and instant removal of water vapor and steam from the matrix, said means consisting of ports adapted to admit atmospheric air into the vacuum chamber.

3. In a stereotype matrix former and dryer, the combination of a hollow frame, a convex curved face-heater so mounted on said frame as to float thereon and provided with a porous resilient covering and having mounted thereunder electric heating elements; a matrix-holding chamber having end-sealing plates and an inner perforated vacuum plate curved to conform to said face-heater for receiving a matrix to be dried, a manifold hingedly connecting said vacuum chamber and said hollow frame; electric heating elements mounted within said chamber adjacent to the inside of said inner vacuum plate; means for producing uniform and rapid drying of the matrix, said means including a reflector plate having vents therethrough and adjacent to said heating element; means for controlling the flow of air and moisture over the surface of the matrix, said means consisting of a baffle plate which, together with the reflector plate and the end sealing plates, form a chamber through which the air and moisture are evacuated, and a cover plate adapted to close the matrix-holding chamber; means securing said cover plate, said baffle plate, said reflector plate and said inner perforated vacuum plate to said manifold; means for maintaining the form of a bolster margin on each end of the said matrix, said means including a movable bolster bar located at each end of the matrix, slideably mounted on said inner vacuum plate and provided with mechanically-actuated means whereby said bolster bars contact and follow the matrix as it shrinks; means for exhausting air and moisture from said matrix and to hold the matrix in contact with said vacuum plate, said means including a vacuum pump and a passageway through the hollow frame, the manifold, and suitable ports connecting the vacuum pump and the matrix-holding chamber; means for insuring a continual circulation and instant removal of water-vapor and steam from the matrix, said means consisting of ports adapted to admit atmospheric air into the vacuum chamber.

4. In a stereotype matrix former and dryer, the combination of a hollow frame, a convex curved face heater so mounted on said frame as to float thereon and provided with a porous resilient covering and having mounted thereunder electric heating elements; a matrix-holding chamber having end sealing plates and an inner perforated vacuum plate curved to conform to said face-heater for receiving a matrix to be dried, a manifold hingedly connecting said vacuum chamber and said hollow frame; electric heating elements mounted within said chamber adjacent to the inside of said inner vacuum plate; means for producing uniform and rapid drying of the matrix, said means including a reflector plate having vents therethrough and adjacent to said heating element; means for controlling the flow of air and moisture over the surface of the matrix, said means consisting of a baffle plate which, together with the reflector plate and the end sealing plates, form a chamber through which the air and moisture are evacuated, and a cover plate adapted to close the matrix-holding chamber; means securing said cover plate, said baffle plate, said reflector plate and said inner perforated vacuum plate to said manifold; means for maintaining the form of a bolster margin on each end of the said matrix, said means including a movable bolster bar located at each end of the matrix, slideably mounted on said inner vacuum plate and provided with spring-actuated means whereby said bolster bars contact and follow the matrix as it shrinks, said means including operating rods pivotally mounted in said bolster bars, a relatively weak spring adapted to actuate said rods and bolster bars, increasing the distance between said bars when the vacuum chamber is open, and a relatively strong spring adapted to reduce the distance between said bolster bars, causing them to follow the shrinkage of the matrix when the vacuum chamber is closed; means for exhausting air and moisture from said matrix and to hold the matrix in contact with said vacuum plate, said means including a vacuum pump and a passageway through the hollow frame, the manifold, and suitable ports connecting the vacuum pump and the matrix-holding chamber; means for insuring a continual circulation and instant removal of water-vapor and steam from the matrix, said means consisting of ports adapted to admit atmospheric air into the vacuum chamber.

CRAIG C. BAKER.